(12) United States Patent
Ouyang

(10) Patent No.: US 7,031,414 B2
(45) Date of Patent: Apr. 18, 2006

(54) COMBINED FEEDFORWARD FILTER FOR A DECISION FEEDBACK EQUALIZER

(75) Inventor: Feng Ouyang, Holmdel, NJ (US)

(73) Assignee: Globespan Virata Inc., Red Bank, NJ (US)

( * ) Notice: Subject to any disclaimer, the term of this patent is extended or adjusted under 35 U.S.C. 154(b) by 428 days.

(21) Appl. No.: 10/322,568

(22) Filed: Dec. 19, 2002

(65) Prior Publication Data

US 2003/0112903 A1 Jun. 19, 2003

Related U.S. Application Data

(60) Provisional application No. 60/342,197, filed on Dec. 19, 2001.

(51) Int. Cl.
*H04L 25/08* (2006.01)
*H04L 1/00* (2006.01)
(52) U.S. Cl. ............ 375/348; 375/233; 375/350; 370/286; 348/614
(58) Field of Classification Search ............ 375/348, 375/233, 152, 350, 231; 714/704; 348/614; 370/286
See application file for complete search history.

(56) References Cited

U.S. PATENT DOCUMENTS

| | | | |
|---|---|---|---|
| 5,127,051 A * | 6/1992 | Chan et al. | 375/348 |
| 5,414,733 A * | 5/1995 | Turner | 375/233 |
| 5,436,929 A | 7/1995 | Kawas Kaleh | |
| 5,561,687 A | 10/1996 | Turner | |
| 5,946,351 A * | 8/1999 | Ariyavisitakul et al. | 375/233 |
| 6,167,082 A | 12/2000 | Ling et al. | |
| 6,614,836 B1 * | 9/2003 | Halford et al. | 375/152 |
| 2003/0123586 A1 * | 7/2003 | Yen | 375/350 |

FOREIGN PATENT DOCUMENTS

| | | |
|---|---|---|
| EP | 0851637 A2 | 7/1998 |
| WO | WO 0228040 A1 | 4/2002 |

OTHER PUBLICATIONS

International Search Report dated Jun. 4, 2003, for Application No. PCT/US02/40592.
John R. Barry et al., "Capacity penalty due to ideal zero-forcing decision-feedback equalization," Proceedings of the International Conference on Communications (ICC), May 23-26, 1993, vol. 3, pp. 422-427 (abstract).

(Continued)

*Primary Examiner*—Stephen Chin
*Assistant Examiner*—Ted M. Wang
(74) *Attorney, Agent, or Firm*—Hunton & Williams

(57) ABSTRACT

A method and apparatus for mitigating for inter-symbol interference in a communication system using a multi-rate adaptive decision feedback equalizer (DFE) with a feedforward filter which is a combination of a first feedforward filter (FF1) that performs match filtering and a second feedforward filter (FF2) which runs at a lower sampling rate than first feedforward filter (FF1), thereby, reducing the total the number of computation done at the receiver, and removes ISI and white noise.

The present invention also employs a method and apparatus where the initial training is done separately for the first feedforward filter (FF1) and the second feedforward filter (FF2). An approximate solution of the optimal receiver has the first feedforward filter (FF1) maximize the output signal to noise ratio (SNR) which is used to train first feedforward filter (FF1).

4 Claims, 3 Drawing Sheets

OTHER PUBLICATIONS

Walter Y. Chen, "HDSL transceiver performance optimization," Communication for Global Users, Including a Communications Theory Mini Conference, Dec. 6-9, 1992, Proceedings of the Global Telecommunications Conference, vol. 1, pp. 64-68, (abstract).

* cited by examiner

COMBINED FEEDFORWARD FILTER FOR A DECISION FEEDBACK EQUALIZER

CROSS REFERENCE TO RELATED APPLICATIONS

Priority is claimed based on U.S. Provisional Application No. 60/342,197 entitled "Combined Feedforward Filter for a DFE" filed Dec. 19, 2001.

FIELD OF THE INVENTION

The present invention relates to equalizers, and particularly to a fully adaptive modem receiver, using multi-rate feedforward filter decision feedback equalizer (DFE).

BACKGROUND OF THE INVENTION

Modern communication systems that operate near theoretical limits to meet the ever increasing demand for high speed, reliable data transmission, employ equalization techniques in transmitters, receivers or both to optimize or nearly optimize transmission and reception. Such equalization is done digitally by adaptive digital filters in order to provide a flexible way of accommodating different types of channels as well as different types of noise environments. In digital subscriber line (xDSL) environments, the transmitted signals suffer from a number of impairments including crosstalk, attenuation and interference caused on one twisted pair due to signals that leaks from another twisted pair, intersymbol interference (ISI) due to line attenuation and delay variations with frequency which causes successive transmitted symbols to interferer, thereby, causing the symbol-by-symbol detection at the receiver to be inadequate and unreliable. Today's communication systems often rely on the rapid transmission of successive signals to represent a selected sequence of information-bearing symbols. Typically, ISI manifests itself as secondary signal components that hamper the detection of the primary, information-bearing signal components.

In one model, the non-ideal channel may be characterized as having a number of signal paths of different lengths coupling a common transmitter and receiver. For this characterization, the secondary signal components resulting from ISI may be thought of as "echoes" of the signals that occur during transmission over the multiple propagation paths. Because of the presence of the aforementioned ISI, the use of equalizers are common in the industry. Equalizers typically cancel the secondary signal components or constructively combine the secondary signal components with the primary signal components to improve reconstruction of the intended symbols.

Some equalization techniques used in existing receivers may employ a decision feedback equalizer similar to the one shown in FIG. 1. In FIG. 1, the signal is transmitted from transmitter 105, through a channel 110, where the signal may become corrupted from intersymbol interference (ISI) caused by the spreading of a transmitted symbol. This in turn may interfere with the immediately adjacent transmitted symbol and, in some severe cases, with other symbols in the data stream. Noise, mostly white noise 120, is added to the corrupted transmitted signal in summer 115 and passed on to receiver 160 for processing. The signal is sampled at the input of the receiver 125 at T/U rate, T denoting the symbol time and U being an integer. The sampling time is typically lower than the Nyquist sampling time. The feedforward filter 130, adjusts the phase of the 131, so that it appears that the 131 is caused by previously transmitted symbols (causal ISI). Since the previously transmitted symbols are available in the receiver 160, the feedback filter 150 receives at its input the actual signal nearest to the estimated outputted by a decision making device such as a slicer 145. This is then subtracted from the feedforward filter 130 output at the summing device 140.

In existing devices, the oversampling rate U, is mandated in order to achieve optimal performance of the DFE. However, this mandated value requires the feedforward filter 130 to have U times as many taps as the number of symbols should cover. This increases resource (memory and calculation speed) requirements for the receiver 160. Other drawbacks of current systems also exist.

SUMMARY OF THE INVENTION

These and other drawbacks of existing systems are overcome by an exemplary embodiment of the present invention is directed toward a method and apparatus for mitigating for inter-symbol interference in a digital communication system using a multi-rate adaptive DFE with a feedforward filter which is a combination of a first feedforward filter (FF1) that performs match filtering and a second T-spaced feedforward filter (FF2) that removes ISI and white noise.

Another embodiment of the present invention is directed toward a method and apparatus that comprise a first feedforward filter that maximize the signal to noise ratio at its output and a second feedforward filter that runs at a lower sampling rate, thereby, reducing the total the number of computation done at the receiver.

Another embodiment of the present invention employs a method and apparatus where the initial training is done separately for the first feedforward filter (FF1) and the second feedforward filter (FF2). An approximate solution of the optimal receiver has the first feedforward filter (FF1) maximize the output signal-to-noise ratio (SNR) which is used to train first feedforward filter (FF1). Other advantages and features of the invention will be apparent from the following description of the drawing figures.

BRIEF DESCRIPTION OF THE DRAWINGS

The present invention can be understood more completely by reading the following Detailed Description of the Invention, in conjunction with the accompanying drawings, in which.

DETAILED DESCRIPTION OF THE INVENTION

The following description is intended to convey a thorough understanding of the invention by providing a number of specific embodiments and details involving an effective method and apparatus of removing inter-symbol interference from a received signal. It is understood, however, that the invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

ISI is a signal impairment condition that occurs when a succession of symbols are transmitted, and where the symbols interfere with each other by overlapping, thereby, rendering the individual symbols inadequate.

In some embodiments, the channel in which the signal is transmitted through may modeled as:

$$r(t) = \sum_k I_k h(t - kT) + n(t) \quad (1)$$

where, r(t)—is the received signal as a function of time,

I—is the transmitted symbol, h—is the channel response, n(t)—is the noise (assumed to be white) as a function of time, and k—is the summation variable.

To reduce the ISI, the received signal may be inputted into a first feedforward filter (FF1), which is a matched filter S, the result of the matching of the received response is;

$$S_s(t) = h^*(-t) \quad (2)$$

where, $S_s$, is the optimal response for FF1, h is the channel response used in (1) and the operator "*" means complex conjugate.

The output of the matched filter may be sampled at the rate of T, and used as the input to the second T-spaced feedforward filter (FF2), where, together with the feedback filter (D), the ISI is substantially removed.

Figure 1:
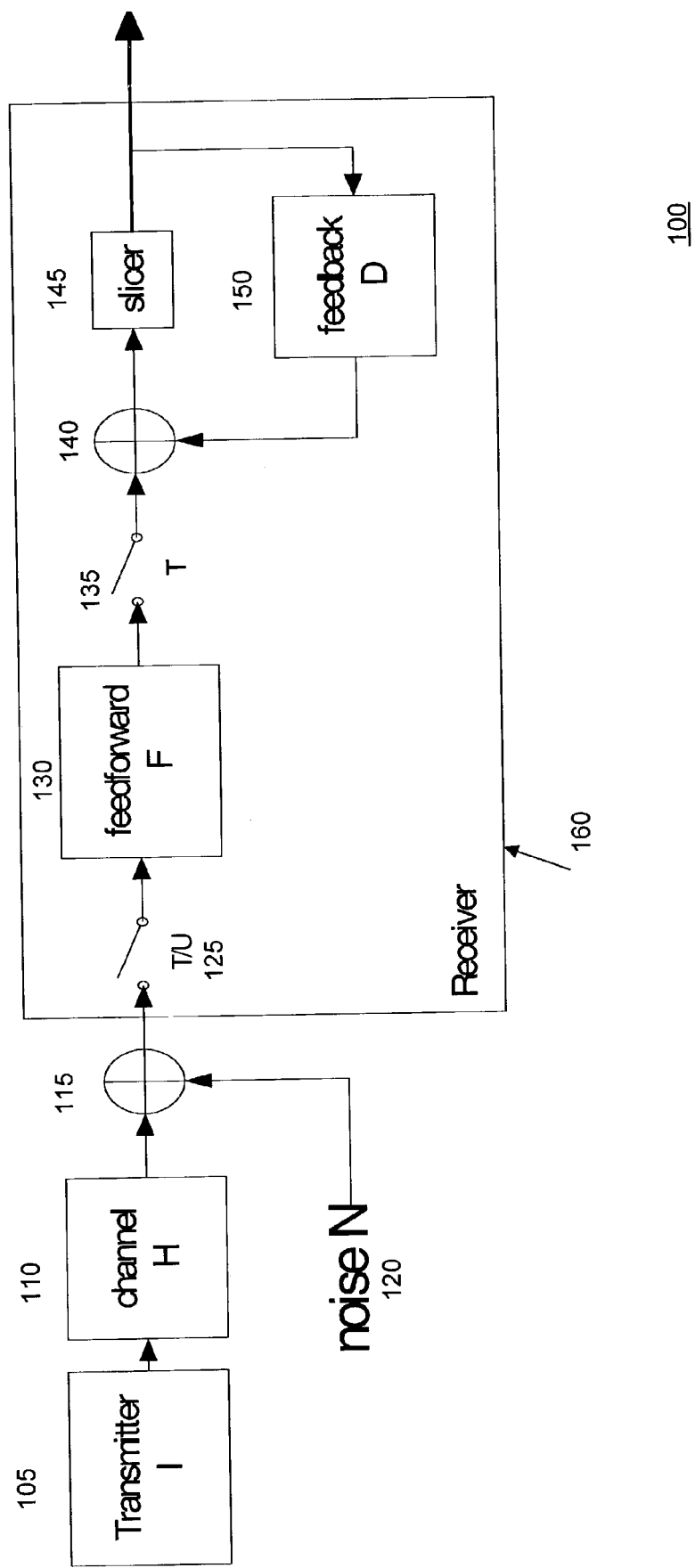
FIG. 1 is a block diagram of an existing decision feedback equalizer (DFE) used in a receiver.
Figure 2:
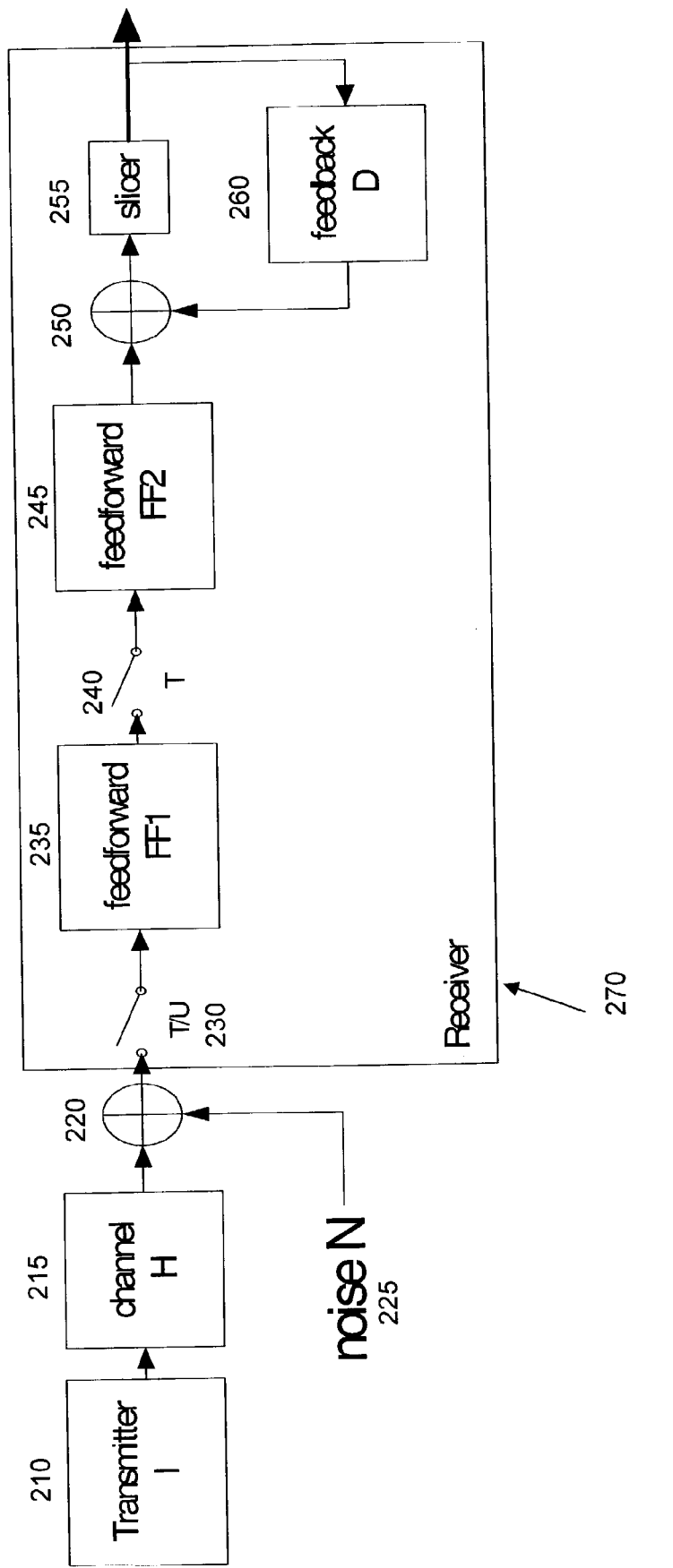
FIG. 2 is a block diagram of a decision feedback equalizer (DFE) according to an embodiment of the present invention.

According to one embodiment of the present invention and in reference to FIG. 2, the signal may be transmitted from a far-end transmitter 210, through a channel 215. The signal may become corrupted from 131 caused by the spreading of a transmitted symbol which in turn would interfere with the immediately adjacent transmitted symbol and, in certain severe cases, with other symbols in the data stream. Noise (e.g., white noise) 225 may be added to the corrupted transmitted signal in a summer 220. The transmitted signal may then be passed on to receiver 270 for processing. The signal may be sampled at the input of the receiver 230 at T/U rate, T denoting the symbol time and U being an integer. The sampling time may be lower than the symbol time T. The first feedforward filter (FF1) 235, may maximize the SNR at its output. The subsequent second T-spaced feedforward filter (FF2) 245 which may operate at a lower sampling rate (e.g., higher sampling time), adjusts the phase of the ISI, so that it appears that all the ISI have been caused by a previously transmitted symbols. Since the previously transmitted symbols are available at the receiver, the feedback filter 260 receives at its input the actual signal nearest to the estimated outputted by a decision making device, such as a slicer 255, which is then subtracted from the feedforward filter output at the summing device 250.

Figure 3:
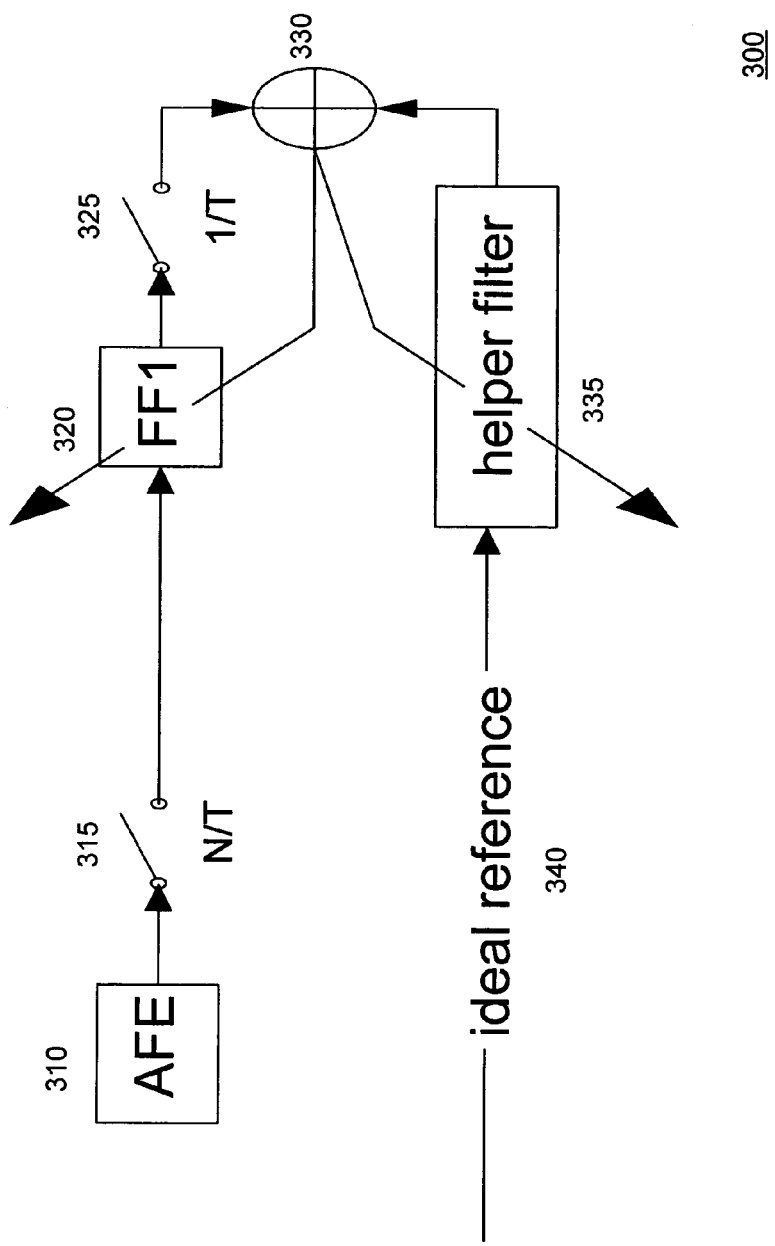
FIG. 3 is a block diagram illustrating a training technique of a first feedforward filter in a decision feedback equalizer (DFE) according to an embodiment of the present invention.

FIG. 3 depicts another embodiment of the present invention comprising a communication system 300. The training of the first feedforward filter (FF1) 320 may be achieved by using an appropriate criterion. For example, an appropriate criterion may be that in an approximate solution of the optimal receiver, FF1 320 maximizes the SNR. A reference signal, shown as ideal reference 340 may be used for the adaptation of filter (FF1) 320 coefficients to generate a replica of the transmitted data sequence. Filter 335 may comprise a helper filter.

During a training session, as shown in FIG. 3, a received signal may be fed to filter (FF1) 320 for training. Ideal reference 340 (either pre-determined or generated by receiver using some other algorithm) may also be fed to the helper filter 335. The difference between the two outputs (i.e., the output of the comparitor 330), is referred to as the error signal. This error signal is used to jointly adapt the two filters under training, (i.e., FF1 320 and the helper filter 335). The goal of training may be to minimize the error signal. As the result of training, the output of the helper filter 335 mimics the signal portion in the output of FF1 320. Therefore, the error signal respresents the noise portion of in the output of FF1 320.

The training process may maintain a constant signal power at the output of helper filter 335, so that minimizing the error signal is equivalent to maximizing the output SNR of FF1 320. This can be achieved in a number of ways. For example, the filter taps in the helper filter 335 can be frequently renormalized during the training process, so that the filter gain remains at unity in (1).

After removing ISI, feedforward filter (FF2) 245 provides the equalized data to a decision-making device such as the slicer 255. The output of the slicer 255, which is the actual nearest to the estimate is inputted into the feedback filter 260. After FF1 235 is trained (e.g., as discussed in connection with FIG. 3), the remainder of the equalizer, FF2 245 and D in FIG. 2 can be trained as a conventional DFE. The invention also enables use of a trellis decoder in a known manner.

While the invention has been described in conjunction with the preferred embodiments, it should be understood that modifications will become apparent to those of ordinary skill in the art and that such modifications are intended to be included within the scope of the invention and the following claims.

What is claimed is:

1. A method for adaptively mitigating inter-symbol interference, the method comprising:

receiving an impaired signal that comprises a successive number of symbols transmitted at a predetermined transmit symbol time;

filtering the successive number of symbols with a first feedforward filter to maximize a signal to noise ratio and produce a filtered output;

filtering the filtered output with a second T-spaced feedforward filter; and training the first feedforward filter and the second T-spaced feedforward filter separately, wherein a helper filter is used to train first feedforward filter wherein the helper filter that is used to train the first feedforward filter receives ideal reference samples as an input.

2. The method of claim 1, wherein first feedforward filter uses a criterion of maximizing the signal to noise ratio to train first feedforward filter.

3. An apparatus for adaptively mitigating for inter-symbol interference, comprising:

a receiver for receiving an impaired signal that comprises a successive number of symbols transmitted at a predetermined transmit symbol time;

a first feedforward filter for filtering the successive number of symbols to maximize a signal to noise ratio and produce a filtered output;

a second T-spaced feedforward filter for filtering the filtered output; and a training device for training the first feedforward filter and the second T-spaced feedforward filter separately, wherein a helper filter is used to train the first feedforward filter wherein the helper filter that is used to train the first feedforward filter receives ideal reference samples as an input.

4. The apparatus of claim 3, wherein the first feedforward filter uses a criterion of maximizing a signal to noise ratio to train first feedforward filter.

* * * * *